March 15, 1949.  A. S. TORRES  2,464,421
ROASTING METHOD
Filed Nov. 22, 1948
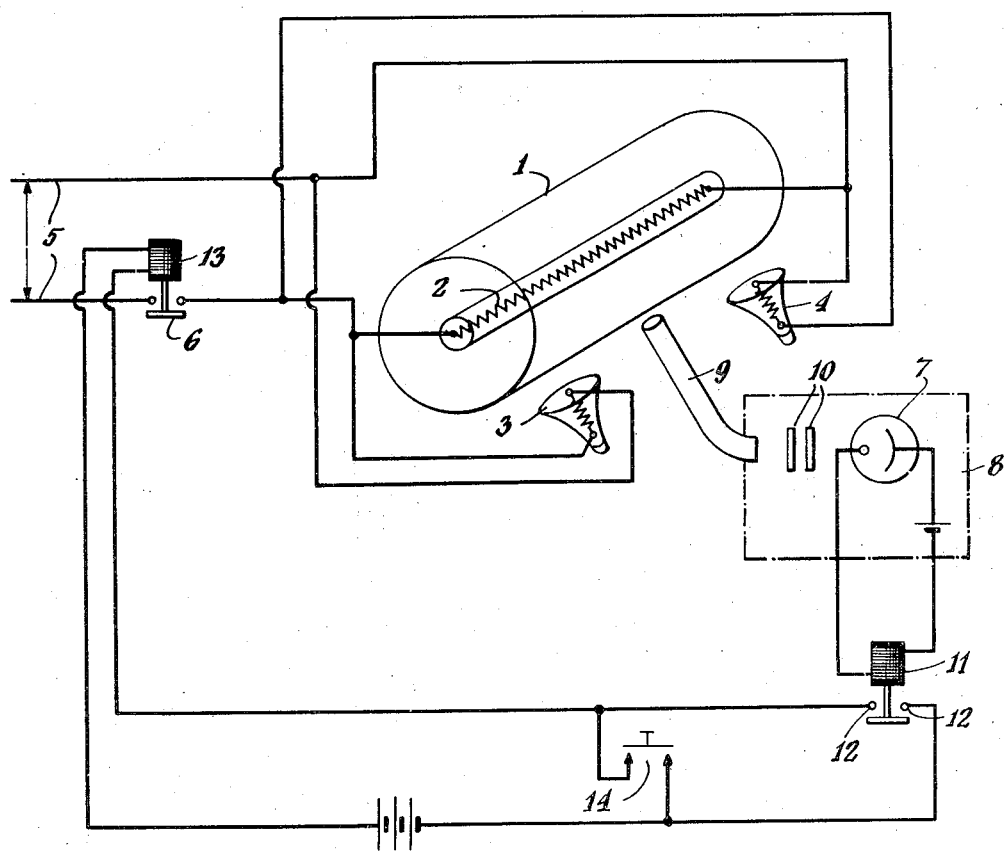
INVENTOR.
August S. Torres
BY
Robert S. Dunham
ATTORNEY Patented Mar. 15, 1949

2,464,421

UNITED STATES PATENT OFFICE 2,464,421

ROASTING METHOD

August S. Torres, Framingham, Mass.

Application November 22, 1948, Serial No. 61,486

8 Claims. (Cl. 99—68)

This invention relates to a method of roasting edible beans, nuts and grain and to the automatic control of such roasting method. The invention will be described with reference to the roasting of coffee, but it is to be understood that it is equally applicable to the roasting of other beans, nuts, or grain having characteristics in common with coffee. This application is a continuation-in-part of my application Serial Number 660,722, filed April 9, 1946.

It is an object of this invention to effect the thorough roasting of a batch of coffee in the shortest possible period of time. This objective is achieved by subjecting the coffee under treatment to the influence of heat from a plurality of different sources, at least one of such sources emitting radiations in the infra red band of the spectrum.

It is another object of the invention to automatically control the roasting period in order to produce a batch of coffee having an optimum roasted condition. This object of the invention is attained by using the energy reflected from a batch of coffee beans under treatment as the factor controlling the method.

In the conventional method of roasting coffee the green coffee beans are agitated in a rotary drum for a period of time ranging from fifteen to thirty minutes while maintaining the atmosphere in which the coffee is being agitated at a temperature of 420 degrees F. It is known among coffee experts that the best coffee roast is that obtained in the shortest possible roasting period consistent with thoroughly roasted coffee, but the heating methods used in the ordinary roasting process do not permit the use of temperatures materially in excess of 420 degrees F. without burning the coffee under treatment, and the mere shortening of the roasting period, without a proportionate elevation of the roasting temperature, of course, results only in an under-roasted end product.

My observations have demonstrated that the mere increase of the convection heat in a roasting chamber is ineffective to produce a satisfactory roast. When the heat within the roasting receptacle is raised to 475 degrees F. without a safeguard against external burning of the batch, a noticeable charring takes place on the surface of the bean before the interior is properly roasted. At 500 degrees F. this effect is pronounced.

I have succeeded in producing perfectly roasted coffee by confining a batch of green coffee in a heated atmosphere and subjecting the coffee in such atmosphere to the penetrating action of radiations below the visible red band of the spectrum.

In general, my method involves agitating a batch of coffee in a confining media which freely transmits infra red radiations. Specifically, I perform my method by agitating a batch of coffee in a drum which receives the major portion of its roasting heat from a source of heat within the drum. The convection temperature within the drum is maintained in excess of 500 degrees F. Whatever the adopted roasting temperature may be, the major portion of the heat is supplied as convection heat by the heat source within the roasting drum. A source of infra red radiations which produces only a minor amount of the roasting heat is positioned externally of the agitating drum and directs its rays against the coffee beans under treatment within the drum. The penetrating infra red radiation appears to act as a carrier for the convection heat within the drum and thus permits the application of a high degree of heat for a short period of time to produce a thorough and properly roasted batch of coffee.

My inquiries have demonstrated that this method may be performed effectively at the relatively high temperature of 850°–900° F. When maintaining the temperature within the roasting drum in the neighborhood of 900 degrees F., the coffee under treatment within the drum becomes properly roasted within one minute, 20 seconds to two minutes, 10 seconds, depending on the moisture content of the green beans, as distinguished from the much longer period of time required by conventional methods.

In the foregoing practice of my method I have placed one pound of green coffee beans into the preheated atmosphere of the agitating drum. Before and during the roasting period the internal drum heater generated a convection temperature of 780 degrees F., and four 250 watt infra red lamps were positioned externally of the drums so that their rays were intercepted by the coffee within the roasting receptacle. The temperature generated by the infra red lamps was of the order of 585 degrees F., raising the overall temperature within the drum to 900 degrees F. The coffee under treatment was roasted for a period of one minute, 20 seconds and in that time it attained a rich brown color and the individual beans were well expanded but suffered less loss in weight than coffee roasted by conventional methods. Furthermore, the beans were found to have been roasted thoroughly throughout and volatile aromatic oils were fully developed and retained in the bean. Green coffee can be roasted according to my method at 600 degrees F. if subjected to a roasting period of not substantially more than three minutes. On the other hand, dry coffee roasted in accordance with my method at 1,000 degrees F. is thoroughly roasted in not substantially more than one minute.

My roasting method becomes most effective at the temperature at which the conventionally applied roasting heat begins to burn the surface layers of the coffee beans without effecting a roasted interior, i. e. a convection temperature of 475°–500° F. within the roasting drum. This follows from the fact that the method is designed to permit the rapid roasting of coffee by using a temperature which in conventional methods would produce such external burning but no proper internal roasting.

Accordingly, in another practice of my method I have preheated the atmosphere of the roasting drum to 500 degrees F. by means of a heater within the drum which generated the major portion to the roasting temperature in the form of convection heat. The rays of six externally located infra red ray lamps were directed into the drum, these rays constituting a minor portion of the roasting temperature. Four pounds of green coffee beans were admitted to the preheated drum where the batch was heated and agitated for a period of not substantially more than three minutes at which time it had acquired the characteristic brown color of a medium roast. The batch was immediately discharged from the roasting drum and cooled by using a forced draft of cool air. In no event has it been necessary to roast a batch of coffee at the above temperature for more than four minutes to obtain a satisfactory roast.

When a batch of coffee was roasted as described, except for the use of the infra red ray lamps, the coffee was externally scorched and internally under-done, as described hereinbefore, but when the roast of the foregoing example was examined, it had attained a rich brown color and the individual beans were expanded beyond conventional expectation; the batch suffered less loss in weight than coffee roasted by conventional methods; the beans were found to have been thoroughly roasted throughout; and the volatile aromatic oils were fully developed and retained in the beans.

Heretofore coffee roasting receptacles have been internally heated and the application of infra red radiation in the roasting of coffee has also been suggested. Ordinarily it would seem that the roasting effect following from the combination of two such energy sources might be predicted with reasonable accuracy. However, this is not the case as indicated in the following examples wherein the heat sources of my method have been used separately at their optimum energy output in the roasting of a pound of coffee and wherein the conditions were otherwise as in the foregoing examples:

One pound of coffee was placed in the roasting receptacle after the same had been preheated solely by the use of four externally positioned infra red lamps. The roasting process was conducted for a period of 28 minutes before the coffee bean attained a shade of brown that is, within limits, characteristic of roasted coffee. When the coffee bean was subjected to examination, it was found that it was baked, the beans individually were not expanded, and the aromatic oils were dried out of the bean.

Following this the coffee roasting receptacle was preheated to a temperature of 780 degrees F. by means of the internal heater alone and a pound of coffee was agitated under the influence of the continuing heat for a period of 12 minutes before the coffee bean attained a shade of brown indicative of a dark roast. When the coffee beans roasted under these conditions were examined, they were found to be burnt in their surface layers and relatively unroasted on the interior. The aromatic oils within the beans were undeveloped and for a large part those in the shallow zones of the beans were driven to the surface of the bean. There was evidence that the aromatic oils that were most affected by the heat were destroyed, at least in part.

My roasting method includes a novel control system which may be used in its operation. The expert coffee roaster observes the color of the coffee bean during the roasting period to judge the progress and condition of the roast. Automatic roasting period control has been suggested on the basis of coffee color. Thus, the roasting process has been halted under the control of photo-electric devices which operate by comparing the color of the roasting beans with a predetermined color standard.

The control feature of my invention is predicated on my observation that few batches of coffee attain the same color when roasted to an optimum degree and that, therefore, the color of the coffee bean is not a true index to its roasted condition. The color which a coffee bean attains under roasting conditions is influenced by a number of factors which are unrelated to the time and temperature factors during roasting. Thus the age, the moisture content, and the concentration of heat on the surface of the bean all influence the shade of brown the beans reach under the same temperature and time limitations.

I have discovered that the coffee bean undergoes a change during the roasting process which affects its ability to reflect energy and particularly energy in the form of infra red radiation. Furthermore, I have discovered that when the energy reflection factor of the coffee bean has been destroyed to a predetermined degree, the coffee has reached a properly roasted condition. I have found that a green coffee bean has a marked ability to reflect radiant energy and particularly energy in the form of infra red radiation, but that this ability progressively disappears as the roasting process continues. Whether there is a change in the organic structure of the bean, whether it is the carbonization of the bean, or whether the molecular structure is altered is not entirely clear, but whatever the change may be, I have found that a batch of coffee is well roasted when it loses its ability to reflect radiations between 8,000 and 12,000 Angstrom units. The best roast, according to my discovery, is obtained when the reflection factor of the coffee bean for radiation wave lengths of 12,000 Angstrom units reaches substantially zero value.

In pursuing this feature of my invention I detect the visible and infra red rays reflected from the batch of coffee under treatment and I pass these rays through an infra red transmission filter which eliminates substantially all of the visible light rays. The rays passing through the filter are directed against a photo-electric cell which is activated by the infra red rays and which is effective to bring to an end the roasting operation when there is a failure of reflected radiation in the range of 12,000 Angstrom units.

The performance of the method will be most readily understood by reference to the diagrammatic drawing forming a part of the application wherein the equipment includes a drum 1 which is either formed of some transparent material which will confine heat therein but which will transmit infra red radiations or a wire mesh drum enclosed in a heat-retaining oven and into which the green coffee beans are introduced. The drum may be mounted for rotation and driven in any suitable manner (not shown). The coffee beans may be introduced into the drum through the ends thereof.

In carrying out the invention, the coffee beans are subjected to heat from different sources and the primary source may comprise an electrical heater 2 arranged along the axis of the drum. The heater 2 may be of the conventional type including a filament and a sheath therefor to prevent oxidation of the heater wire and to otherwise protect the heating filament.

The secondary source of heat includes at least one source of infra red rays and in the embodiment illustrated two infra red ray lamps 3 and 4 are so arranged as to project the infra red rays into the drum through the peripheral wall thereof. The infra red ray lamps are preferably mounted below the drum so that the coffee lying in the lower portion thereof will intercept the infra red rays.

In carrying out the invention, the infra red ray lamps are energized and the electrical heater 2 is also energized. The infra red ray lamps 3 and 4 are preferably connected in parallel with each other and in parallel with the electrical heater 2 as shown in the drawing. The electrical heater and the infra red ray lamps may be supplied from a source of current 5 upon closure of a relay 6. The coil of this relay is energized to close the contacts thereof when the push button 14 is closed.

The coffee introduced into the drum 1 is therefore subject to the heat generated by the electrical heater 2 and it is also subject to irradiation of the infra red rays projected by the lamps 3 and 4. The roasting of the coffee continues until a predetermined roasted condition is attained in the coffee beans whereupon the control feature of the invention takes command of the process to interrupt the roasting process.

The roasting period is interrupted upon substantial failure of infra red rays reflected from the coffee beans. A photo tube is employed for initiating the interruption of the roasting period and the photo tube 7 is encased in a suitable opaque housing 8 so that the tube will not be influenced by visible light rays. An infra red ray conducting tube 9 extends from a position adjacent the periphery of the drum 1 into the housing 8. This light wave conducting tube is sheathed with an opaque cover and the tube is of the type to conduct light waves therealong. The tube 9 accordingly conducts reflected infra red rays from the green coffee beans into the housing where they fall upon the photo tube 7. An infra red ray transmission filter arrangement 10 is interposed between the photo tube and the lower end of the light conducting tube 9 so as to filter out all visible light rays. The tube 7 is accordingly responsive only to reflected infra red rays.

When the infra red rays reflected from the incompletely roasted coffee beans within the drum 1 fall upon the photo tube 7, the relay coil 11 is energized so as to close the contacts 12 and thereby maintain the relay 6 closed. When the infra red rays reflected from the coffee beans fall below a predetermined value which has been determined to lie between 8,000 and 12,000 Angstrom units, the tube 7 is no longer activated and the relay coil 11 is accordingly deenergized. When the contacts 12 open, the relay coil 13 is likewise deenergized to interrupt the supply of current to the electrical heater 2 and the infra red ray lamps 3 and 4. The control arrangement is accordingly operable in response to the absence of infra red rays reflected from the coffee beans and the roasting period is accordingly terminated when the infra red ray reflection factor of the coffee beans has been reduced to the point indicated.

Having thus described the invention with particularity with respect to its preferred practice, it will be obvious to those skilled in the art, after understanding the invention, that it may be practiced in modified form without departing from the spirit and scope of the invention.

It is desired in the appended claims to cover all such changes and modifications as are within the scope of the invention.

I claim:

1. The method of roasting coffee which comprises admitting a batch thereof to an atmosphere preheated to a temperature of more than 500 degrees F., agitating the batch in said atmosphere while elevating the temperature thereof above the preheated temperature, directing against said agitated batch of coffee radiations of a length in excess of those in the visible red of the spectrum, and continuing the roasting operation for a period of time not less than 1 minute, 20 seconds and not more than 3 to 4 minutes.

2. The method of roasting coffee which comprises admitting a batch of coffee to a preheated medium that will retain heat but will transmit long wave radiations, agitating the coffee in said confining media while maintaining therein an atmosphere elevated to a temperature of 500-900 degrees F., directing against said agitated batch of coffee radiations of a length in excess of those in the visible red of the spectrum, and continuing said roasting operation for a period of time not less than 1 minute, 20 seconds and not more than from 3 to 4 minutes.

3. The method of roasting coffee in a confining medium in which green coffee beans may be subjected to roasting temperatures while being agitated, which comprises first generating within the medium the major part of a roasting temperature, thereafter admitting a batch of green beans into said medium only when a temperature of not substantially less than 500 degrees F. has been attained therein, continuing the application of heat and agitating said batch throughout the roasting period, generating rays of a wave length in excess of 8,000 Angstrom units by means independent of the major roasting heat source, directing such radiations against the batch under treatment within said medium, promptly removing the batch from the confining medium upon attainment of the color indicative of a desired roasted condition, and immediately thereafter subjecting the roasted batch to the influence of a cooling fluid.

4. The method of roasting coffee in a confining medium in which green coffee beans may be subjected to roasting temperatures while being agitated, which comprises first generating within the medium the major portion of a roasting temperature, thereafter admitting a batch of green beans to said medium only when a predetermined temperature has been attained therein, continuing the heating of said batch until a temperature of more than 500 degrees F. is attained in said confining medium, agitating said batch throughout the roasting period, generating a minor portion of the roasting temperature and rays of a wave length in excess of 8,000 Angstrom units by means independent of the major roasting heat source, directing such radiations against the batch under treatment within said medium, promptly removing the batch from the confining medium after roasting the same for a period of not substantially more than three minutes, and immediately thereafter subjecting the roasted batch to the influence of a forced cooling fluid.

5. The method of controlling the roasting of coffee which comprises agitating a batch of coffee in an atmosphere elevated to a temperature in excess of 500 degrees F., directing infra red rays against the mass of coffee under treatment, detecting the infra red rays reflected from said batch of coffee, destroying the infra red reflection factor of the coffee batch by continued roasting, and discontinuing the roasting operation upon failure of reflected rays within the range of 8,000–12,000 Angstrom units.

6. The method of controlling the roasting of coffee which comprises agitating a batch of coffee in an atmosphere elevated to a temperature in excess of 500 degrees F., directing infra red rays against the mass of coffee under treatment, detecting the infra red rays reflected from said batch of coffee, destroying the infra red ray reflection factor of the coffee batch by continued roasting, and discontinuing the roasting operation upon failure of reflected rays above 12,000 Angstrom units.

7. The method of roasting coffee which comprises agitating a batch of coffee in an atmosphere elevated to a temperature between 500–1,000 degrees F., directing infra red rays against the mass of coffee under treatment, detecting the infra red rays reflected from said batch of coffee, destroying the infra red ray reflection factor of the coffee batch by continued roasting, and discontinuing the roasting operation upon failure of the reflected rays within the range of 8,000–12,000 Angstrom units.

8. The method of roasting coffee in a confining medium in which green coffee beans may be subjected to roasting temperatures while being agitated, which comprises first generating within the medium the major part of a roasting temperature, thereafter admitting a batch of green beans into said medium only when a predetermined temperature has been attained therein, agitating said batch throughout the roasting period, generating rays of a wave length in excess of 8,000 Angstrom units by means independent of the major roasting heat source, directing such radiations against the batch under treatment within said medium, destroying the infra red reflection factor of the batch by continued roasting at a temperature in excess of 500 degrees F., promptly removing the batch from the confining medium upon failure of reflected rays within the range of 8,000–12,000 Angstrom units, and thereafter subjecting the roasted batch to the influence of a cooling fluid.

AUGUST S. TORRES.

No references cited.